United States Patent [19]

Seneau

[11] Patent Number: 4,839,178

[45] Date of Patent: Jun. 13, 1989

[54] METHOD FOR PRODUCING A PRE-PROOFED, FROZEN AND UNBAKED DOUGH HAVING AN IMPROVED SHELF LIFE

[75] Inventor: Bernard Seneau, Woodbridge, Conn.

[73] Assignee: General Foods Corporation, White Plains, N.Y.

[21] Appl. No.: 62,093

[22] Filed: Jun. 12, 1987

[51] Int. Cl.$^4$ ...................... A21D 10/02; A23C 21/06
[52] U.S. Cl. ......................................... 426/19; 426/23; 426/583; 426/549
[58] Field of Search ........................... 426/583, 549, 19

[56] References Cited

U.S. PATENT DOCUMENTS

| | | | |
|---|---|---|---|
| 4,088,791 | 5/1978 | Jones | 426/583 |
| 4,406,911 | 9/1983 | Larsen et al. | 426/19 |
| 4,416,903 | 11/1983 | Cole | 426/549 |
| 4,501,757 | 2/1985 | Smith et al. | 426/62 |
| 4,526,795 | 7/1985 | Wolf | 426/502 |

OTHER PUBLICATIONS

Hall et al., Drying of Milk and Milk Products, 1966, Avi Publishing Co., Inc., Westport, Conn., p. 174.

*Primary Examiner*—Donald E. Czaja
*Assistant Examiner*—Helen Pratt
*Attorney, Agent, or Firm*—Thomas R. Savoie; Daniel J. Donovan

[57] ABSTRACT

A method for improving the shelf life of a pre-proofed, frozen and unbaked dough-containing product, preferably a croissant, by the addition of a mixture having skim milk and whey protein; the skim milk and whey protein mixture being added to the dough in an amount in the range of about 2.5 to 5%, by weight, of flour in non croissant dough-containing products i.e. those having less than about 30%, by weight, of butter, and 2.2% , by weight, of the flour content for a croissant having about 30%, by weight, of butter. The skim milk-whey protein mixture is added to the dough along with an equal amount of water at about 60° F. The shelf life-improved, pre-proofed, frozen unbaked dough product and the croissant product made according to the method are also disclosed. The whey protein component of the added mixture is obtained by coagulating skim milk by an organic culture, preferably Rennet.

7 Claims, No Drawings

METHOD FOR PRODUCING A PRE-PROOFED, FROZEN AND UNBAKED DOUGH HAVING AN IMPROVED SHELF LIFE

BACKGROUND OF THE INVENTION

The present invention relates to the bakery field and, specifically, relates to a method and a product produced by the method which has a prolonged shelf life. Even more specifically, dough containing bakery products if first proofed, then frozen prior to baking exhibit, prior to the present invention, a predetermined relatively short shelf life of about 8 weeks, at best. The present invention relates to a method for significantly increasing the shelf life of the dough containing product while maintaining an extremely delicious taste and, in addition, while also maintaining the desirable aroma which is produced by baking subsequent to removal of the product from a storage freezer and placing the same in an oven for baking.

In the preferred embodiment of the present invention, the shelf life of a croissant which has been preproofed, frozen, prior to baking, is provided.

Thus, the present invention provides a preproofed, frozen yet unbaked dough containing product which has a significantly extended shelf life and therefore, has maintained within the bakery product, for a longer period of time, the $CO_2$ and moisture originally entrapped therein such that, upon actual baking of the product, after removal of the same from a freezer or other cold storage device, a good taste is provided and a fresh baked aroma is emitted.

DESCRIPTION OF THE PRIOR ART

Frozen bakery products which have not yet been oven baked have been in existance for quite some time. After thawing of the flour containing dough, it is conventional and required for the product to be proofed, prior to baking. The disadvantage of these type of products, however, is that the proofing process, i.e. the process by which the flour containing product actually expands in volume by the fermentation action producing $CO_2$ is desirably performed under controlled conditions with humidity, time, and temperature being carefully monitored and adjusted.

Ordinary household consumers, in contrast to retail establishments, are relatively incapable of satisfactorily monitoring the proofing of a product prior to baking and, therefore, products which are already proofed, prior to freezing, are highly desirable so long as the volume of the product, after freezing, is substantially the same as the volume of the product after proofing and prior to freezing. With these latter type of products, after the bakery product has been maintained in a freezer or other cold storage container for a period of time, and then removed and thawed, the product is merely placed into an oven, for the appropriate time and at the desired temperature, and a freshly baked dough containing product is provided which has good taste and, in addition, a freshly baked aroma is provided. This is extremely desirable for retail concerns capable of advertising "freshly baked on the premises" and, also, to household consumers.

In addition, of course, it is well known to provide proofed, then baked and then frozen products to consumers. These products are already proofed and baked and then frozen for subsequent use by thawing and followed by consuming.

A disadvantage of these products, however, is that the consumer does not get a freshly baked product, nor, indeed, does the consumer appreciate the freshly baked aroma but, rather he is experiencing merely a reheated already baked aroma and the associated product taste.

In addition, there is now available to consumers proofed, then frozen, yet unbaked dough containing products, more specfically, croissants, which have a shelf life of only about 8 weeks. It is clearly desirable from a consumer and, in addition, from a manufacturing and marketing perspective to increase the shelf life of this type of product, while maintaining the good taste of the product upon baking and, in addition, while maintaining the freshly baked aroma which occurs after thawing and during the actual baking process. This is clearly a desirable objective, i.e. an already proofed product, capable of being stored in a home freezer for use, as desired, which, after thawing and subsequent baking has a shelf life, in the frozen state, of greater than a mere eight weeks. Also, it is desirable to be able to manufacture such a dough containing product with ordinarily available commercial baking apparatus and without special handling or complicated procedures.

One of the present methods of improving the shelf life of dough containing baked products is adding whey protein, itself, which is mixed with the dough prior to proofing and freezing. This does, indeed, increase the shelf life of the product and, yet, the taste of the product is negatively impaired by the addition of the whey protein. It is believed that the pH of the whey protein, itself, is about 2.0 and the addition to the dough composition of a material at a pH of about 2.0 is probably the cuase of the negative impact on the taste.

In addition, another available manner of improving or increasing the shelf life of dough containing bakery products is the addition of a gluten supplement to the flour, or, alternatively, the use of exclusively high gluten type flour, as the flour composition in the dough of the bread product. While this, too, does in fact, increase the shelf life of the bakery product, the taste of the product is again not nearly as good as that of a bakery product having a low gluten flour or a flour which is neither provided with a gluten supplement nor exclusively based on gluten. In addition, the use of higher amounts of gluten flour creates a dough product, prior to proofing, which is much more elastic and, therefore, the gluten supplemented or gluten exclusive flour composition type doughs are extremely difficult to machine and, indeed, they have a tendency to clog up the commercial bakery machinery during processing at a high production level.

Milk, whether as skim or whole, has in the past also been used in the bakery field, as a supplement to the bakery ingredients. Indeed, milk, whole or skim, is used in the preparation of sweet dough and, has also been used in the manufacture of white bread. Milk, alone, whether skim or whole, would not, however, increase the shelf life of baked products. Rather, it has been added primarily to alter flavor. The addition of milk has also been used to take out the flakiness of a croissant product.

In addition, whey protein, when combined with skim milk, has been considered as an egg substitute or replacement ingredient in baking. It has never, however, been suggested to combine whey protein and skim milk, in the percentages and manner described herein, for the purpose of extending the shelf life of a bakery product containing flour while maintaining a delicious taste of the product and, in addition, by maintaining the aroma of the product upon baking.

Rennet, an enzyme or organic culture, is obtained from the stomach of certain types of suckling mammals (calves or adult bovines) and has been used as a culture in the manufacture of various types of dairy products, for example, cottage cheese, swiss cheese, cheddar, etc. However, it has never been suggested to combine whey protein, which is obtained by the coagulation of skim milk by the use of the Rennet culture, with skim milk, and, then to add the same to the dough products along with a quantity of water to improve the shelf life of a preproofed, frozen, yet unbaked bakery product while simultaneously preserving taste, baking aroma and allowing for ease of manufacturing on a commercial scale. Furthermore, it has never been suggested to increase the shelf life of a preproofed, frozen and unbaked croissant by the controlled addition of water and a mixture of skim milk and whey protein, while preserving taste and the freshly baked aroma.

SUMMARY OF THE INVENTION

The present invention relates to the addition of a skim milk and whey protein mixture along with water to a dough containing product having flour to improve the shelf life of the product. Thus, it is a specific object of the present invention, disclosed herein, to increase the shelf life of a dough containing product. Specifically, with reference to a croissant product which, ordinarily contains about 25 to 30%, by weight, of butter, the addition of the mixture containing whey protein and skim milk to the croissant detrempe, prior to proofing and subsequent freezing, increases the shelf life from a now available maximum of about six or eight weeks to about 12-14 weeks. This is clearly highly desirable for the ultimate consumer and also for the manufacturer and marketer of the improved product. The increased shelf life is accomplished by the present invention without the loss of the fine taste of theproduct and, in addition, is accomplished while maintaining the freshly baked aroma of the product upon actual baking, after the product is first removed from the freezer when desired to be baked. Thus, the present invention provides for a longer lasting and fresher tasting preproofed and frozen, yet unbaked, product which is capable of being, at the appropriate time, placed in an oven for fresh baking. The present invention accomplishes the desired purpose without increasing the quantity of gluten protein in the dough which, as mentioned, ordinarily negatively impacts on the taste of the product or, alternatively, makes the dough more elastic to such an extent that the higher gluten content or exclusively gluten content of the dough is so elastic that handling by ordinary bakery machinery is extremely difficult. Rather, the present invention provides for the addition of a skim milk and whey protein mixture to the dough, along with a quantity of water, which relaxes the dough and provides for the maintenance of the moisture content and $CO_2$ content of the dough product, during the freezing period, to thereby maintain the shelf life of the product for a much longer period of time than is otherwise now available. Also, the aroma of the freshly baked dough containing product is maintained.

An unbaked, yet frozen and already proofed corissant product has tremendous commercial potential. It offers to the end user a frozen product that need not be proofed by the consumer (which, as mentioned, must be done under precisely controlled temperature, humidity and time conditions) but, rather the user can take the frozen product directly out of the frezer and immediately place the same into a oven for baking therein. In this manner, a freshly baked croissant or other bakery product containing dough as the principal ingredient is obtained having a delicious taste, a freshly baked aroma and an improved shelf life.

However, since the commercial production of proofed, frozen yet unbaked products is relatively new, it has been found, by experience, that the shelf life of this product (prior to the present invention) is relatively short, about 6 to 8 weeks, and, therefore, that certainly negatively impacts on the potential for commercialization of this product. It is important to the ultimate consumers to maintain the right density of the product i.e., the weight per unit volume (increased by proofing and preserved by freezing), and, in addition, to maintain the buttery taste as well as the freshly baked aroma of the product upon actual baking. Past experience has shown that the shelf life of such a product barely reached four weeks and this, therefore, created a serious obstacle to commercially manufacturing and distributing the product on a large scale.

The relative short shelf life of the proofed, frozen yet unbaked dough containing product is though to be explained by the relative low protein content, in the range of about 11.5 to 12.5% in the blend of flour ordinarily used in this product. Of course, if the protein content is increased by either utilizing a high gluten flour or, alternatively, by using a gluten supplement, the shelf life can be extended, but, as peviously mentioned, this will negatively impact on the ability of the product to be easily machined and, in addition, can very well negatively impact on the otherwise present exceptional taste of the product. Thus, it is not a viable solution to increase the amount of protein in the product for the purpose of extending the shelf life since that would negatively impact on the machineability, aroma upon baking and taste of the product.

Utilizing a mixture of skim milk and whey protein along with the necessary amount of water to dilute the same, in the relative low protein blend of flour gives a unique aromat to the finished product, provides exceptional taste to the product, and, in addition, increases the shelf life to about 12-14 weeks. In addition, the use of the skim milk-whey protein mixture, along with water, relaxes the dough so that it is not too elastic and this provides ease of machining.

The present invention has application not only to preproofed unbaked frozen, unbaked croissant products having about 25 to 30%, by weight, of butter in their composition, but, in addition, relates to any preproofed, frozen unbaked dough product, containing flour, wherein it is desirable to improve the shelf life of the product while maintaining the good taste and freshly baked aroma.

In order to retain the shelf life of the flour containing product, it is necessary for the substantial maintenance of the moisture and $CO_2$ content in the preproofed frozen yet unbaked dough. It is necessary to substantially retain the $CO_2$ gases inside the frozen product without having to use any additional gluten which, by its properties, renders the dough extremely elastic and practically unmachinable for an industrial production. Also, the addition of gluten to the dough composition alters the taste of the final product which, again, is undesirable. Also, it is desirable to retain the $CO_2$ gases within the frozen, proofed product without having to increase the amount of the leavening agent (compressed yeast). In order to retain and hold the moisture content within the frozen, already proofed dough composition, prior to baking, and thereby retain the frozen volume of the dough product, composition additive must be provided which does not negatively impact on the desirable features of the bakery products.

Also, as previously mentioned, milk, whether skim or whole, has previously been used in ordinary bread dough making but it has never, prior to the present invention, been suggested to utilize a cultured compound, whey protein, in particular, with skim milk in order to obtain a preproofed, unbaked, frozen dough with a long shelf life.

In the preferred embodiment, a frozen croissant product, having a significantly improved shelf life is provided which maintains a freshly baked aroma, upon thawing and baking, and, in addition, maintains a superior taste while also allowing the dough, during the formulation stage, prior to proofing, to be easily machined by ordinary commercial bakery machines. The present invention provides, therefore, a practical use of a breakthrough technique in the preproofed frozen unbaked dough and gives a new product, namely, a preproofed frozen, yet unbaked, dough product with a length of shelf life necessary to allow for its full commercialization and distribution after its industrial production.

According to the invention, a mixture or compound is made from skim milk and whey protein (an enzyme-portion of skim milk remaining after coagulation and separation of casein). According to the preferred embodiment of the present invention, the type of whey protein used in the compound is an acid whey having a pH of about 4.4 to 4.6. The skim milk is combined with the whey protein and then added to any formula or recipe of dough, containing flour, that will be preproofed, frozen and, yet, unbaked. With such an addition of the described compound to the dough, along with a suitable quantity of water, the water molecules will be bound inside the dough thereby maintaining the dough's moisture and thereby preserving the shelf life of the product. Also, the mixture will increase the retention of $CO_2$ gases inside the unbaked, preproofed, frozen dough in a very large proporion; and, in addition, will maintain the fresh flavor and texture of the preproofed, frozen, unbaked dough even after about 12 weeks in the frozen state. Furthrmore, a high percentage of calcium is present in the compound employed to increase the shelf life of the dough-containing product and, this, too, is a benefit of the present invention.

It has been found to be most effective to combine about 17,000 pounds of skim milk with about 10 pounds of whey protein or, on a percentage basis, 0.06% of whey protein for every pound of skim milk. It should be appreciated that the organic culture used to coagulate the skim milk, in order to form the whey protein, is an extract of the Rennin enzyme having a pH of about 3.8. This Rennin enzyme is obtained from the abonassum portion of the stomach of suckling mammals called Rennet and, is found in calves or adult bovine. It has now been found that ideal results are obtained by adding the compound to the dough at about 2.2%, by weight, of the flour content of the dough to obtain a dough with about 25 to 30%, by weight of butter or fat, that, after lamination, proofing and freezing will be a croissant which will retain, even after about 12 weeks, most of its original specifications including, exceptional taste, aroma and texture.

For other dough products containing flour, not necessarily required to be laminated and containing less than about 30%, by weight, of butter or fat but, nevertheless, being proofed and frozen, prior to baking, the percentage of the compound (the skim milk and whey protein) depends on the formula of the dough but, basically, will be in the range of about 2.5% to 5%, by weight, of the flour used in the formula. This will, of course, slightly vary depending upon the type, composition and amount of flour, fat, sugar and yeast used in the dough composition. It should be appeciated that the compound is either first diluted, prior to mixing in the dough with about an equal amount of water at about 60° F. or, alternatively, the compound and about an equal quantity of water at about 60° Farenheit are mixed together to form the dough.

The compound employed herein has a pH of about 4.3 to 4.5 and has never been used in preproofed, frozen unbaked dough products and has especially not been used in preproofed, frozen and unbaked croissant products since the same are relatively new. As previously mentioned, milk, whether skim or whole, has been used in bread dough making for taste purposes but has never been used with a cultured compound (the whey protein) in order to obtain the improvement described herein with respect to providing a preproofed, frozen and unbaked dough having improved shelf life, exceptional machineability, a freshly baked aroma upon baking and a delicious taste.

DETAILED DESCRIPTION OF THE INVENTION AND THE PREFERRED EMBODIMENT OF THE INVENTION

As mentioned, the present invention relates to a method of manufacturing a preproofed, frozen and unbaked dough-containing product and the product formed thereby, preferably being a croissant product, which has an lengthened shelf life. A purchaser of the product, upon desiring a freshly-baked dough-containing product, merely has to remove the item from the freezer and place the same in a preheated oven for the appropriate amount of time to bake the same. Upon removal from the oven, a freshly baked croissant is provided having a delicious taste and a freshly baked aroma.

The preparation of the dough-containing croissant product proceeds in a quite conventional manner and requires, as the particular recipe demands, the combination and mixing of dry ingredients and water as, for example, flour, water, fat (preferably butter) yeast or another leavening agent and, if required or desired, eggs or sugar or other ingredients for other purposes. In any event, however, once the dough is substantially prepared and mixed whether or not containing butter, it is then appropriate to add the skim milk and whey protein mixture, along with water at about 60° F. for the purpose of extending the shelf life of the product. This mixture is then diluted with water prior to mixing or mixed with the water and the dough all at once. The dough is then proofed and then flash frozen prior to baking. When it is desired to bake the flour containing product, it is merely necessary to remove the same from the freezer and then place it in a preheated oven for the appropriate time and temperature to achieve a freshly baked product which has, hopefully, depending upon the taste and ingredients of the original recipe, a superior taste and the aroma of a freshly baked product. In any event, the four-containing dough product will not degrade, over time, as other preproofed, frozen, yet unbaked products have done in the past.

The mixture, which is added to the dough is, in the case of a product having less than about 30%, by weight, of fat or butter, added to the dough in an amount in the range of about 2.5% to 5%, by weight, of the flour component of the dough. In addition, the skim milk and whey protein composition which is added to the dough is either diluted by water prior to introduction into the dough, by combining about an equal amount of water with the quantity of mixture itended to be introduced into the dough or, alternatively, the mixture and water can be added at once to the dough prior to further mixing. In the preferred embodiment of the present invention, the water, combined with the skim milk and why protein mixture, is at a temperature of about 60° F. and is present in an amount about equal to the quantity of the mixture added to the depth.

In the preferred embodiment of the present invention, it is contemplated that a croissant product be manufactured. In this connection, any basic croissant recipe can be used with the skim milk, whey protein and water mixture added thereto but, I have found that the following recipe is extremely desireable from a taste and aroma point of view. In this connection, it should be appreciated that when the dough contains about 25 to 30%, by weight, of fat or butter and it is intended to be laminated, as a croissant, it is desireable to add about 2.2% of the flour, by weight, of the skim milk and whey protein compound to the dough and a like amount of wateer again, either by diluting the same prior to introduction or by mixing, all together, the skim milk-whey protein, water and dough. In the case where the flour composition has less than about 30%, by weight, of fat or butter, the skim milk and whey protein mixture is added to the dough in the range of about 2.5% to 5.0% by weight, of the flour content of the dough along with a like amount of water at a temperature of about 60° F.

It should be appreciated that the skim milk and whey protein composition is obtained by combining, according to the preferred embodiment, about 17,000 pounds of skim milk to about 10 pounds of whey protein or, stated another way, for every pound of skim milk, about 0.06% of whey protein is provided. In this connection, it should be appreciated that the culture used to coagulate skim milk to provide the whey protein is an extract of the Rennin enzyme having a pH of about 3.8 and is obtained from the abonassum portion of the stomach of suckling mammals called Rennet, preferably obtained from calves or adult bovine. In this manner, a solid mixture is obtained. The solid is then diluted with about an equal amount, by weight, of water, the water being at a temperature, preferably, of about 60° F. Then, the entire mixture and water, is added to the dough containing flour for ruther processing, proofing and then flash freezing, all prior to eventual, selective baking. Alternatively, as mentioned, the water, skim milk and whey protein mixture and flour containing dough are mixed together, at one time.

As previously discussed, the amount to the skim milkwhey protein mixture, added to the dough, in the case of a croissant product is about 2.2%, by weight, of the flour content of the detrempe and an equal amount of the skim milk and whey protein compound, of water is added also to the detrempe prior to futher processing.

In the case of a dough product which contains less than about 30%, by weight, of fat or butter, i.e., those products which are not necessarily laminated but, nevertheless, proofed and frozen in an unbaked form, the percentage of the skim milk and whey protein compound depends on the recipe of the dough but will be in the range of about 2.5% to 5%, by weight, of the flour used in the particular dough. This will, of course, vary depending upon the type of flour used, the type and quantity of fat added to the dough, and the amount of sugar and yeast.

The skim milk and whey protein compound, prior to being mixed with the water, has a pH of about 4.3 to 4.5. It provides an extended shelf life to a proofed, frozen yet unbaked dough-containing product and, in specific, provides an improved shelf life of about 12 to 14 weeks for a proofed, frozen yet unbaked croissant product having about 25 to 30%, by weight, of butter.

The preferred recipe for the croissant detrempe and the manner of making the same is as follows:

Dry ingredients of flour, yeast, sugar, salt and water are combined together. In connection with the preparation of a single commercial batch of the croissant product, 100 pounds of total flour is considered a standard and percentages of ingredients are based on this 100 pound of total flour. The preferred embodiment of the invention contemplates that the 100 pounds of flour comprise about 78 pounds or 78% of patent flour, i.e., flour having a high percentage of ashes and 22 pounds or 22% of clear flour (a weak flour). The yeast is added to the flour mixture in a 2 to 4% quantity which, in accordance with the embodiment now disclosed, ranges from about two to four pounds of yeast. Sugar is then added to the flour and yeast dry mixture, in an amount of about 8% or, in the 100 pound standard, in an eight pound quantity. To the flour, yeast and sugar mixture, salt is added which, in the preferred embodiment, is done so in an amount of about one pound and 12 ounces, and represents 1.75%. The dry ingredients (flour, yeast, sugar and salt) and thoroughly mixed together. A total of about 58 pounds or 58% of water is then added to the mixture with the addition of the water being preferably done in three separate stages, i.e., approximately one-third of the total pound quantity of water being first added to the dry ingredients, followed by mixing, and then the second third of the water added and mixes in followed by addition of the final third pounds of water being added and mixed. This produces a desired consistency of the detrempe.

According to the preferred embodiment of the croissant product, it is desireable to have the 58 pounds of water added to the dry ingredients at a temperature such that the detrempe composition is maintained at a temperature of about 35° F. This is accomplished by utilizing cold water and/or sufficient ice such that, depending upon the amount of water being added, the detrempe is maintained at about 35° F.

It is at this time that the appropriate quantity of the skim milk and whey protein compound is added to the detrempe composition and thoroughly mixed therein. Again, it should be appreciated that the skim milk-whey protein mixture is either first diluted with an about equal amount of water or, alternatively, the skim milk-whey protein mixture is added to the detrempe composition along with the water. In any event, the water is at a temperature of about 60° F. In the case of this croissant product, about 2.2%, by weight, of the mixture, sans water, is added to the detrempe in relation to the quantity of flour used in the detrempe. Where the mixture is added to a dough containing product, about 2.5% to 5.0%, by weight, of the flour of the dough.

After the detrempe is fully mixed along with the skim milk, whey protein and additional water, it is cut into pieces of about 12 pounds each and placed on trays, two to a tray. The trays are then refrigerated at about 35° F. for approximately six hours.

After the refrigeration of the detrempe, the butter is folded into the detrempe pieces. Approximately 30% of the weight of the detrempe pieces of butter is folded into each piece. In the preferred embodiment, therefore, 30% of the 12 pound pieces results in an addition of about 3.6 pounds of butter to each of the detrempe pieces. The butter, too, has been previously maintained at about 35° F. and is added to the detrempe pieces at that temperature. The butter is simply spread on one-half of the pieces with the other half of the pieces being folded over the butter so that a butter-type sandwich is provided with half of the 12 pound detrempe piece on the bottom and half of the 12 pound detrempe piece on the top of the evenly-spread 3.6 pounds of butter held therebetween.

The piece is now apprximately five inches high and, next, the piece is flattened and laminated through standard laminating machinery to approximately one and one-quarter inches in height, while maintaining the width at the original width such that, in order to maintain volume, the length of the piece obviously increases about fourfold. After initial flattening and laminating, the detrempe is divided into thirds and folded with a first outside one-third layer over the middle one-third layer and the second opposite and outside one-third layer folded on top of the first outside and now folded one-third layer. The entire flattening and laminating process, i.e., the "tours" of the process is conducted at approximately room temperature and certainly at a temperature not greater than about 65° F. After folding, as described above, the product is passed through the flattening and laminating machine, again, to produce a product of about one and one-quarter inches in height. A second folding in thirds and passage through the flattening and laminating machinery is accomplished. After the product is passed through two tours, representing two passages through the laminating machinery and two folding procedures for the detrempe, the product is then allowed to rest at about 35° F. for about one and one-half hours.

After the rest time, the detrempe composition is once again laminated through the standard laminating machinery to a final thickness of about one-quarter to three-eighths of an inch in height. After final lamination or the final, third tour of the product, the croissant is passed to a standard cutting and forming machine which forms croissants in the conventional three corner, triangular shape. According to the preferred embodiment of the invention, 15 such triangularly-shaped croissants are panned onto a single sheet which is about 18 inches by 26 inches.

The panned croissants are then placed into a fermentation or proofing room which is maintained at a constant temperature of about 85° F. with an atmospheric humidity of about 70%. The panned croissants are maintained in the fermentation room for about 45 to 75 minutes for proofing purposes. In connection with the proofing of the croissants in the fermentation room, the volume of the croissants enlarge by about two to two and one-half times their original volume. During the proofing process, the yeast of the dough increases in activity to generate $CO_2$ which results in the expansion of volume of the croissant.

After full proofing in the fermentation room, the croissant products are flash frozen in a flash freezer which is itself maintained at about $-30°$ F. The croissants are placed in the flash freezer for about 30 minutes or until the central core of the croissant products reach a temperature of between about 0° F. to about 10° F. After the flash freezing of the croissants, they are removed and a thin film of egg wash, i.e., an egg yolk and egg white standard composition is applied to the croissant products which egg wash almost instantly freezes on the surface of the croissants since the croissants are of a surface temperature which is very cold in comparison to the egg wash temperature.

Next, the croissants, still frozen, are packaged and stored at about 0° F. until desireably baked. As previously mentioned, the addition of the skim milk and whey protein composition along with the suitable quantity of water provides an improved shelf life to these croissants from the original about six to eight weeks, maximum, to a new shelf of about 12 to 14 weeks.

When desired, the proofed, already-egg-washed, yet frozen unbaked croissants can be removed from the freezer and plced into a preheated oven at about 350° F. for about 15 to 17 minutes. A beautiful, flaky, golden croissant is obtained having a superior taste and a freshly baked aroma.

It should be understood of course that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A method of improving the shelf-life of a pre-proofed, frozen, laminated dough comprising the steps of:
    (a) forming a dough comprised of flour, water and leavening agent, the flour having a protein content of from about 11.5 to 12.5%;
    (b) adding a mixture of skim milk and acid whey solids and about an equal amount by weight of water to said dough, the level of added skim milk and acid whey solids being about 2.2% to 5% by weight of the flour contained in the dough and the acid whey having a pH of from about 4.4 to 4.6; thereafter;
    (c) adding fat to the dough; and thereafter;
    (d) laminating, proofing and freezing the dough.

2. A method as claimed in claim 1, wherein said acid whey has a pH in the range of about 4.4 to 4.6.

3. A method as claimed in claim 1, wherein said acid whey is about 0.06%, by weight, of said skim milk.

4. A method as claimed in claim 1, wherein said acid whey is obtained by the coagulation of skim milk by an organic culture and subsequent separation out of casein formed thereby.

5. A method as claimed in claim 4, wherein said organic culture is an extract of a Rennin enzyme.

6. A method as claimed in claim 5, wherein said Rennin enzyme has a pH of about 3.8.

7. A method as claimed in claim 1, wherein said water is at a temperature of about 60° F.

* * * * *